United States Patent
Draenert

[11] Patent Number: 5,746,200
[45] Date of Patent: May 5, 1998

[54] TRABECULA NASAL FILTER HAVING BOTH MACROPORES AND MICROPORES

[76] Inventor: Klaus Draenert, Gabriel-Max-Str. 3, D-8000 Munich, Germany

[21] Appl. No.: 407,395

[22] Filed: Mar. 17, 1995

Related U.S. Application Data

[63] Continuation of Ser. No. 862,741, Jun. 19, 1992, abandoned.

[30] Foreign Application Priority Data

Oct. 19, 1990 [DE] Germany .................. 40 33 344.2

[51] Int. Cl.⁶ .................. A61G 10/00; A61M 16/00; A62B 7/10; A62B 23/02
[52] U.S. Cl. .................. 128/206.11; 128/204.12; 128/205.29
[58] Field of Search .................. 128/201.13, 204.11, 128/204.13, 206.11, 848, 858, 863, 205.27–205.29, 204.12

[56] References Cited

U.S. PATENT DOCUMENTS

| | | | |
|---|---|---|---|
| 1,322,375 | 11/1919 | Un | 128/206.11 |
| 2,057,397 | 10/1936 | Strauch | 128/206.11 |
| 2,097,846 | 11/1937 | Strauch | 128/206.11 |
| 2,340,223 | 1/1944 | Krill | 128/206.11 |
| 2,612,583 | 6/1952 | Kjellson | 128/206.11 |
| 3,476,844 | 11/1969 | Villain | |
| 3,513,839 | 5/1970 | Vacante | 128/206.11 |
| 3,766,000 | 10/1973 | Gibson et al. | 161/170 |
| 3,789,029 | 1/1974 | Hodosh | 260/2.5 |
| 3,852,045 | 12/1974 | Wheeler et al. | 29/182 |
| 3,890,107 | 6/1975 | White et al. | 29/183 |
| 3,899,556 | 8/1975 | Heide et al. | 264/44 |
| 3,905,335 | 9/1975 | Kapp | 128/206.11 |
| 4,007,494 | 2/1977 | Sauer | 3/1.9 |
| 4,093,576 | 6/1978 | deWijn | 260/17 |
| 4,131,597 | 12/1978 | Bluethgen et al. | 260/42.18 |
| 4,141,864 | 2/1979 | Rijke et al. | 260/17.4 |
| 4,177,524 | 12/1979 | Grell et al. | 3/1.9 |
| 4,192,021 | 3/1980 | Deibig et al. | 3/1.9 |
| 4,221,217 | 9/1980 | Amezcua | 128/206.11 |
| 4,231,120 | 11/1980 | Day | 3/1.91 |
| 4,245,359 | 1/1981 | Stuhmer | 3/1.9 |
| 4,259,072 | 3/1981 | Hirabayashi et al. | 433/173 |
| 4,267,831 | 5/1981 | Aguilar | 128/206.11 |
| 4,373,217 | 2/1983 | Draenert | 3/1.9 |
| 4,383,956 | 5/1983 | Croft et al. | |
| 4,401,117 | 8/1983 | Gershuny | 128/206.11 |
| 4,500,658 | 2/1985 | Fox | 523/117 |
| 4,547,390 | 10/1985 | Ashman et al. | 427/2 |
| 4,629,464 | 12/1986 | Takata et al. | 623/16 |

(List continued on next page.)

FOREIGN PATENT DOCUMENTS

| | | |
|---|---|---|
| 0 041 614 | 12/1981 | European Pat. Off. |
| 0 047 971 | 3/1982 | European Pat. Off. |
| 0 177 781 | 4/1986 | European Pat. Off. |
| 0 276 836 | 1/1988 | European Pat. Off. |
| 0 332 371 | 9/1989 | European Pat. Off. |
| 530680 | 10/1957 | France |
| 1392000 | 2/1965 | France |
| 1395197 | 3/1965 | France |
| 1402857 | 5/1965 | France |
| 2 344 280 | 10/1977 | France |

(List continued on next page.)

OTHER PUBLICATIONS

*Hawley's Condensed Chemical Dictionary*, 11th ed., eds. Sax et al., Vam Nostrand Reinhold Co., NY. ISBN0442280971 ©1987.

*Primary Examiner*—Kimberly L. Asher
*Attorney, Agent, or Firm*—Kinney & Lange, P.A.

[57] ABSTRACT

The invention relates to a filter with a predeterminably adjustable porosity. The filter can be manufactured by forming a three-dimensional framework made of the filter material around particles, which serve as space retainers for the porosity, and subsequently removing the particles. The filter according to the invention consists of biologically inert material which does not harm the mucous membrane. When used as a nose filter, the filter keeps the breathing air free of particles and harmful gases.

32 Claims, 1 Drawing Sheet

U.S. PATENT DOCUMENTS

| | | | |
|---|---|---|---|
| 4,644,942 | 2/1987 | Sump | 623/16 |
| 4,645,503 | 2/1987 | Lin et al. | 623/16 |
| 4,652,593 | 3/1987 | Kawahara et al. | 523/116 |
| 4,671,263 | 6/1987 | Draenert | 128/92 |
| 4,686,973 | 8/1987 | Frisch | 128/92 |
| 4,718,910 | 1/1988 | Draenert | 623/16 |
| 4,722,870 | 2/1988 | White | 428/621 |
| 4,781,721 | 11/1988 | Grundei | 623/16 |
| 4,839,215 | 6/1989 | Starling et al. | 428/131 |
| 4,853,225 | 8/1989 | Wahlig et al. | 424/423 |
| 4,859,712 | 8/1989 | Cox | 521/62 |
| 4,863,444 | 9/1989 | Blomer | 604/304 |
| 4,891,182 | 1/1990 | Sakamoto et al. | 419/2 |
| 4,919,666 | 4/1990 | Buchhorn et al. | 623/16 |
| 4,950,295 | 8/1990 | Weigum et al. | 623/16 |
| 4,969,906 | 11/1990 | Kronman | 623/16 |
| 4,984,302 | 1/1991 | Lincoln | 128/206.11 |
| 5,089,135 | 2/1992 | Yoneyama et al. | 210/500.23 |
| 5,096,814 | 3/1992 | Aivasidas et al. | 435/41 |
| 5,117,820 | 6/1992 | Robitaille | 128/206.11 |
| 5,201,766 | 4/1993 | Georgette | 623/16 |
| 5,266,248 | 11/1993 | Ohtsuka et al. | 264/44 |
| 5,276,070 | 1/1994 | Arroyo | 523/117 |
| 5,522,894 | 6/1996 | Draenert | 623/16 |

FOREIGN PATENT DOCUMENTS

| | | | |
|---|---|---|---|
| 29 05 878 | 8/1980 | Germany . | |
| 3309855 | 9/1984 | Germany | 128/205.27 |
| 60-179102 | 9/1985 | Japan | 128/205.27 |
| 60-202703 | 10/1985 | Japan | 128/205.27 |
| 908185 | 10/1962 | United Kingdom | 131/332 |
| 8900842 | 2/1989 | WIPO | 623/16 |
| WO 92/04924 | 4/1992 | WIPO . | |

12
TRABECULA NASAL FILTER HAVING BOTH MACROPORES AND MICROPORES

This is a File Wrapper Continuation of application Ser. No. 07/862,741, filed Jun. 19, 1992 now abandoned.

BACKGROUND OF THE INVENTION

FIELD OF THE INVENTION

The invention relates to a filter, in particular a nose filter, and a method of its production.

In filter technology there is a need for filters with continuous porosity which have a structure which allows gases or fluids to be absorbed along large surfaces or particles to be retained in an adjustable cavity system of the filter.

Above all at work places where gases develop, for example high ozone concentrations when working with ultraviolet microscopes, the toxic activity of these gases can be very unpleasant by irritating the mucous membranes, finally causing irritation and inflammation of the lungs.

It is an object of the invention to develop a lastingly effective and simple filter, in particular a nose filter, which filter functions extremely well, is biologically inert as regards compatibility and is safe to use, and which can be reproducibly adapted to the toxicity of the environment by varying its components.

In particular, an object of the invention is to provide a filter and a method of manufacture thereof which enable the filter to be adjusted precisely according to the respective needs with respect to the porosity and the thickness of the matrix structure (bearing structure) as well as with respect to other desired properties such as biological compatibility.

The above object is achieved by the filter according to the patent claims. According to the invention, it is also possible to provide a simple and inexpensive series of filters each of which is capable per se of efficiently fulfilling specific functions.

The invention solves a long-standing problem in the manufacture of filters, namely the manufacture of continuously porous frameworks with adjustable porosity.

In one embodiment, the invention is based on the idea of connecting easily removable, for example easily soluble or easily fusible particles with each other and creating around the particles a three-dimensional framework of supporting structures, preferably of a castable material. Subsequently, the particles can then be removed either physically or chemically, preferably by applying the principle of water solubility or of fusibility, or by applying heat. This is preferably done by starting out from a negative model of the filter formed by the particles.

The filter according to the invention differs from filters manufactured by conventional methods in that both the porosity and the thickness of the trabecula-like matrix structure can be adjusted exactly.

In principle, any material can be used for the negative or positive shape by, for example, combining water soluble or acid soluble particles with fusible materials or water soluble or acid soluble particles with sinterable, castable composite materials or plastics processable by injection molding. The combination of materials is such that the respective type of particles can be dissolved out again, either physically or chemically or in another manner, and the three-dimensional framework remains as a supporting framework. The supporting framework can subsequently be hardened by physical or chemical processes, surface treated or mechanically finished.

The particles and the supporting framework, which preferably consists of a castable material, can also be further processed together, for example mechanically, and only subsequently separated physically or chemically. The resultant three-dimensional frameworks can in turn serve temporarily as a particle for negative models so that both the three-dimensional framework with continuous porosity and the packing or the conglomerate of particles, which are connected to one another and are preferably spherical, can be used alternately as a model. In this way any conceivable materials, combinations of materials and composite materials can be processed to the filter according to the invention.

The filter according to the invention can also be used as a carrier for active components, e.g. all active components which can be applied on surfaces.

With the filters according to the invention, any desired porosity can be selected, and any actively absorbing material can be used in combination with any degree of porosity. A macroscopic large-pore filter system can also be combined with a microporous filter system.

The material for the three-dimensional framework is preferably castable or injectable, for example in injection molding processes. Silicone, a rubber derivative or a related rubber-based polymer is preferred as the material for the three-dimensional framework of the filter.

The particles which serve as a space retainer for the cavity system of the filter are preferably in the form of spheres or uniform, geometrical bodies, for example polygons, but granular material can also be used for the particles. The material of the particles is preferably easily soluble or easily fusible. Particularly preferred are particles of a water soluble material, preferably sugar, which can firstly be bonded to one another in steam to form a particle conglomerate and then washed after the formation and hardening of the three-dimensional framework, for example in a water bed or in a washing machine. The particles may alternatively consist of wax.

Since the size as well as the bulk density and the nature of the connection of the particles serving as space retainers for the cavity system of the filter material can all be selected freely, the porosity of the cavity system of the finished filter can also be freely adjusted. For example, spherical particles can be used if a cavity system with essentially spherical and interconnecting cavities is desired. If a cavity system with cavities of varying size is sought, particles of varying size and/or shape can be mixed with one another. The entire porosity of the finished filter can be purposefully adjusted by controlling variation and combination of the shape and/or the bulk density of the particles and/or by the selection of the process by which the particles are connected to a conglomerate or a dense particle packing.

The particles can be welded together chemically or physically, bonded to one another or connected to one another at their surfaces, preferably by point contacts, for example by applying heat and/or pressure, by a sinter process or with steam. The preferred method depends on the material of the particles. According to the invention, the shape and configuration of the rods or trabeculae of the three-dimensional framework can likewise be predetermined and adjusted according to the intended purpose.

The preferred size of the particles is between approximately 0.5 and 1.5 mm, more preferably 0.8 and 1.2 mm.

Depending on the intended use, various active components can also be added to the filter and the filter or the three-dimensional framework can be mixed with active carbon or another filler which has excellent gas and/or fluid absorbing properties, for example in a concentration of between 5 and 80% by weight.

By using the filter according to the invention in the vestibule of the nose, breathing air can be kept free of particles. Furthermore, by enriching the substance of the framework of the porous filter with actively absorbent materials, such as active carbon, a large portion of the gases from the environment can be absorbed and the respiratory tracts can thus be protected from contamination by toxic gases. This is achieved, for example, with the continuously porous filter with a trabecula structure according to the invention which is very histocompatible and pleasant to wear and which is produced around particles, in particular around spheres of sugar, with a casting material of silicone rubber. Such a filter is manufactured by sintering sugar spheres together in steam and subsequently casting a silicone rubber casting mixture of active carbon and silicone rubber around the sintered spheres. After hardening the material, the trabecula structure of silicone rubber is freed from the sugar inlet in a washing machine and can subsequently be used as a filter.

DETAILED DESCRIPTION OF THE DRAWINGS

Figure 1:
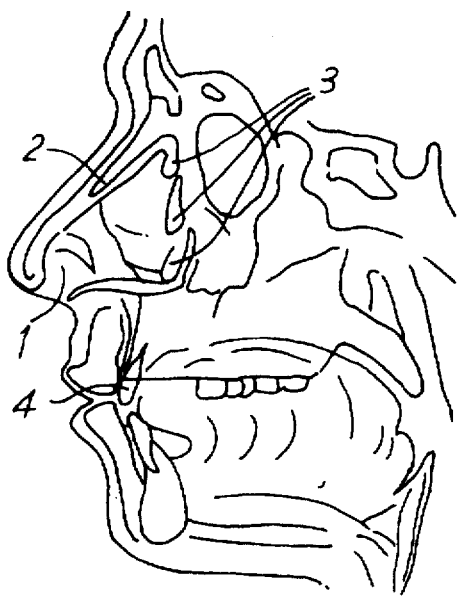
FIG. 1 shows a longitudinal section through a human cranium.

In the longitudinal section through a human cranium of FIG. 1 the vestibule of the nose (vestibulum nasi) 1 into which the filter according to the invention is to be inserted, the nasal bone 2, the choanae 3 and the palate 4 are shown.

Figure 2:
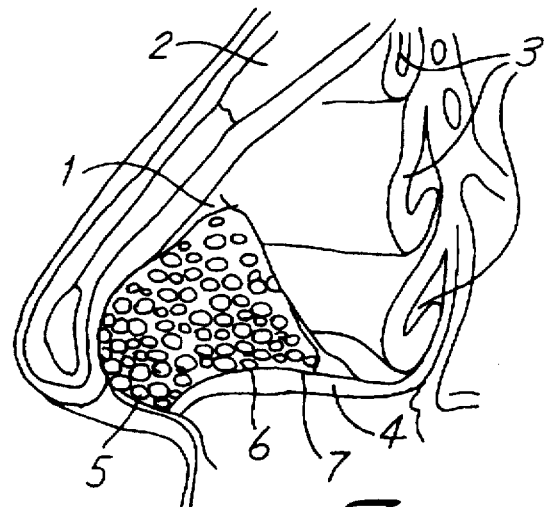
FIG. 2 shows an enlarged part of FIG. 1, with nasal filter according to the invention inserted into the nasal vestibulum.

In FIG. 2 the same reference signs relate to the same parts as in FIG. 1. Additionally, a nasal filter 5 according to the invention is inserted into the vestibulum nasi 1. The filter 5 shows predetermined cavities or macropores 6 surrounded by a three-dimensional framework of trabecula structures 7.

Figure 3:
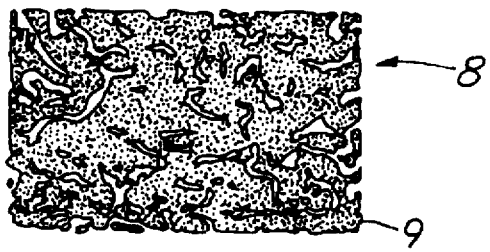
FIG. 3 shows the microstructure of the trabecula structures of the nasal filter according to the invention.

FIG. 3 shows the microstructure of the surface of the trabeculae of the filter shown in FIG. 2. In FIG. 3 the scale is such that 1 cm corresponds to 10 μm. The microstructure exhibits a plurality of micropores, the pore size of which is in the μm range.

Figure 4:
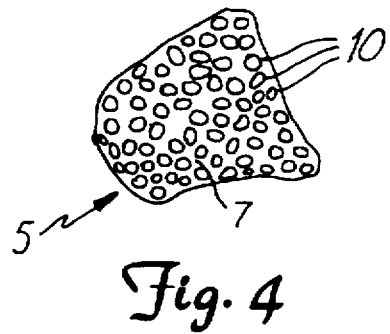
FIG. 4 shows the nasal filter of the invention during manufacture around particles serving as space retainers for the cavities.

FIG. 4 shows the filter 5 of FIG. 2 during manufacture. Trabecula structures 7 are formed around particles 10. After forming, particles 10 are dissolved or otherwise removed to provide the predetermined cavities or macropores 6 shown in FIG. 2.

The filter according to the invention is simple to manufacture in various shapes. When used as a nose filter its external shape is adapted directly to the shape of the vestibule of the nose. Impressions of the vestibule of the nose can for example be obtained from corpses. This makes subsequent mechanical treatment of the filter unnecessary.

In a simple embodiment of the invention, the filter according to the invention consists of suitable porous filter papers, the external shape of the filter, as stated above, being adapted to the shape of the vestibule of the nose so that the filter can be used as a nose filter.

With the filters according to the invention it is not only possible to keep breathing air free of particles but also to keep it free of harmful gases so that any irritations at the work place are avoided. The nose filter according to the invention can, however, also be worn generally when spending time in contaminated air, such as that of today in large cities.

The filter according to the invention is particularly effective if it contains pharmaceutically active substances which can be applied for example in the form of a coating onto the inner surface of the filter. Such substances are for example bronchiolytically or secretolytically active substances, respiratorily active substances such as ethereal oils or substances acting as antibiotics or vasoconstrictors. The pharmaceutically active agent preferably has a concentration of between 0.01 and 10% by weight, and most preferably has a concentration of between 0.1 and 5% by weight.

The filter can also contain preferably 1 to 60% of a filler material which is highly absorbent, for example active carbon or a highly porous calcium phosphate. The filter according to the invention can be coated with active carbon, or a composite material can be used for the material of the filter which contains active carbon or calcium phosphate of high porosity. For instance, the filler material or coating material can be a composite material of 1 to 60% active carbon and a calcium phosphate of high porosity of between 0.5 and 0.8 ml/g.

In a further embodiment, the filter according to the invention comprises an external, preferably multilayered coat and an inlet of active carbon with adjustable porosity.

The filter according to the invention can also be manufactured as a positive model of spheres, fibers or other polymorphic bodies made of a porous material with a high physical and/or chemical adsorptive capacity. Compressed carbon fibers, sintered highly porous TCP and/or cellulose fibers can be used for this for example.

EXAMPLES

Example 1

In a mold welded in metal or plastic according to an impression of a vestibule of the nose which can be used in various sizes, sugar spheres of a size of approximately 0.3 to 1.0 mm are provided in bulk, compressed on a vibrator and subsequently welded together in steam using a vacuum. Into the weld containing the resultant conglomerate of sugar spheres a mixture of silicone and active carbon is cast, the percentage of active carbon being between 5 and 60%, and is subsequently hardened. The resultant composite body is removed from the mold and carefully freed in distilled water from the sugar inlet. When washing out, attention should be paid to ensure that the active carbon is not likewise removed from the composite material of the silicone. The washing-out step is therefore preferably carried out in standing distilled water. After washing out, the structure of silicone and active carbon is retained as the finished filter.

Example 2

A conglomerate of sugar spheres is prepared as described in Example 1. A castable mixture of cellulose fibers is cast around the conglomerate by rotational molding. The sugar is subsequently dissolved out in distilled water. A trabecula filter framework of cellulose is obtained which comprises both macroporosity and microporosity. This filter is subsequently coated with carbon in a carbon evaporating apparatus. The filter is then welded into a thin porous film, preferably of saffron, and is then ready for use.

We claim:

1. A filter with high porosity for temporary insertion via the vestibule of the nose into the external respiratory tracts, said filter being biological inert and not harmful to the mucous membrane, said filter comprising:
   - a three-dimensional framework of trabecula structures which surround predetermined cavities, said cavities forming macropores having a size of between 0.2 mm and several mm and being connected to one another to form an interconnected cavity system, the three-dimensional framework of trabecula structures having an external shape adapted to fit the vestibule of the nose;
   - said trabecula structures being formed of a base material selected from the group consisting of: cast materials and injected materials;
   - said trabecula structures comprising a microporous filter system created by a highly absorbent filler material within or coating the base material.

2. The filter according to claim 1, wherein the trabecula structures are formed around particles serving as space retainers for the cavities.

3. The filter according to claim 2, wherein the particles are first connected to one another and are subsequently removed after the framework forming said trabecula structures has been formed, without affecting said trabecula structures.

4. The filter according to claim 3, wherein the particles are connected chemically or physically with one another and are removed chemically or physically after said trabecula structures have been formed.

5. The filter according to claim 2, wherein the particles consist of a water soluble material.

6. The filter according to claim 5, wherein the particles consist of sugar.

7. The filter according to claim 2, wherein the particles consist of an easily fusible material.

8. The filter according to claim 7, wherein the particles consist of wax.

9. The filter according to claim 2, wherein the trabecula structures comprise a composite material of 1 to 60% active carbon and a calcium phosphate of high porosity of between 0.5 and 0.8 ml/g.

10. The filter according to claim 1, wherein said cavities are spherical.

11. The filter according to claim 1, wherein the cavities have a size of up to approximately 5 mm.

12. The filter according to claim 1, wherein the cavities have various non-uniform sizes.

13. The filter according to claim 1, wherein the base material is selected from the group consisting of: silicone, a silicone-like polymer, a rubber derivative, and a rubber-like polymer.

14. The filter according to claim 1, wherein the base material is elastic.

15. The filter according to claim 1, wherein the trabecula structures contain between 1 and 60% of the highly absorbent filler material.

16. The filter according to claim 15, wherein the filler material is active carbon and a highly porous calcium phosphate.

17. The filter according to claim 1, wherein the filter additionally contains at least one pharmaceutically active agent.

18. The filter according to claim 17, wherein the pharmaceutically active agent has a concentration of between 0.01 and 10% by weight.

19. The filter according to claim 17, wherein the pharmaceutically active agent has a concentration of between 0.1 and 5% by weight.

20. The filter according to claim 17, wherein the filter contains vasoconstrictor as the active agent.

21. The filter according to claim 17, wherein the filter contains substances acting as antibiotics as the active agent.

22. The filter according to claim 17, wherein the filter contains bronchiolytically active substances as the active agent.

23. The filter according to claim 17, wherein the filter contains respiratorily active substances such as ethersal oils, as the pharmaceutically active agent.

24. The filter according to claim 17, wherein the pharmaceutically active agent is applied in the form of a coating onto an inner surface of the filter.

25. The filter according to claim 1, wherein the three-dimensional framework of trabecula structures is formed from a rotationally molded cellulose mass.

26. The filter according to claim 25, wherein the cellulose mass is mixed with active carbon in a concentration of between 5 and 60%.

27. The filter according to claim 1, wherein the cavities are spherical having a diameter of between 0.5 and 1.5 mm.

28. The filter according to claim 27, wherein the cavities are spherical having a diameter of between 0.8 to 1.2 mm.

29. The filter according to claim 1, wherein the cavities are uniform, geometrical bodies.

30. The filter according to claim 29, wherein the cavities are polygons.

31. The filter according to claim 1, wherein the cavities are connected to one another at their surfaces.

32. The filter according to claim 31, wherein the cavities are connected to one another at point contacts.

* * * * *